United States Patent
Kaiho et al.

[11] Patent Number: 6,155,044
[45] Date of Patent: Dec. 5, 2000

[54] EXHAUST GAS PURIFYING SYSTEM FOR INTERNAL COMBUSTION ENGINE

[75] Inventors: Hideo Kaiho; Noriyuki Kishi; Shinichi Kikuchi; Mitsuo Wakabayashi, all of Saitama, Japan

[73] Assignee: Honda Giken Kogyo Kabushiki Kaisha, Tokyo, Japan

[21] Appl. No.: 09/146,552

[22] Filed: Sep. 3, 1998

[30] Foreign Application Priority Data

Sep. 12, 1997 [JP] Japan .................................. 9-267827

[51] Int. Cl.$^7$ ...................................................... F01N 3/00
[52] U.S. Cl. ................................ 60/297; 36/299; 36/301; 36/322; 165/51
[58] Field of Search .............................. 60/297, 298, 299, 60/300, 301, 322, 323, 272, 282; 165/51, 135, 177, 183, 179

[56] References Cited

U.S. PATENT DOCUMENTS

| | | | |
|---|---|---|---|
| 3,864,909 | 2/1975 | Kern | 60/282 |
| 4,345,644 | 8/1982 | Dankowski | 165/154 |
| 4,549,606 | 10/1985 | Sato et al. | 165/179 |
| 4,731,993 | 3/1988 | Ito et al. | 60/299 |
| 4,995,450 | 2/1991 | Geppelt et al. | 165/104 |
| 5,144,800 | 9/1992 | Shioya et al. | 60/323 |
| 5,315,824 | 5/1994 | Takeshima | 60/297 |
| 5,331,810 | 7/1994 | Ingermann et al. | 60/322 |
| 5,603,215 | 2/1997 | Sung et al. | 60/274 |
| 5,697,215 | 12/1997 | Canevet et al. | 60/299 |
| 5,730,001 | 3/1998 | Furukawa | 62/485 |
| 5,914,090 | 6/1999 | Gottberg | 422/171 |

FOREIGN PATENT DOCUMENTS

| | | |
|---|---|---|
| 5-31359 | 2/1993 | Japan . |
| 5-59942 | 3/1993 | Japan . |
| 9-192453 | 7/1997 | Japan . |

*Primary Examiner*—Thomas Denion
*Assistant Examiner*—Binh Tran
*Attorney, Agent, or Firm*—Arent Fox Kintner Plotkin & Kahn, PLC

[57] ABSTRACT

It is an object of the present invention to provide an exhaust gas purifying system for an internal combustion engine in which the rise of the temperature of an HC adsorbent is adequately retarded to improve the purification of HC at the start of the engine.

In an exhaust system of the internal combustion engine, there are provided a three-way catalyst provided in the downstream side of an exhaust manifold, an adsorbent-catalyst provided under the floor of an automotive vehicle and containing at least zeolite in its composition, and a catalyst provided in the downstream side of the adsorbent-catalyst. In particular, the heat capacity of an exhaust gas passage which connects between the three-way catalyst and the adsorbent-catalyst is increased greater than the heat capacity of the exhaust manifold. More particularly, the thickness of a wall of the exhaust gas passage is greater than that of the exhaust manifold. A substrate, a partition, or a muffler is provided across the exhaust gas passage. The exhaust tube in the exhaust gas passage has at least an inner side or an outer side thereof shaped to a convex and concave configuration.

18 Claims, 3 Drawing Sheets

EXHAUST GAS PURIFYING SYSTEM FOR INTERNAL COMBUSTION ENGINE

BACKGROUND OF THE INVENTION

1. Field of the Invention

The present invention relates to an exhaust gas purifying system for an internal combustion engine and particularly to an exhaust gas purifying system for an internal combustion engine, which has an improved capability of purifying hydrocarbons (referred to as HC hereinafter) in the exhaust gas at the start of the internal combustion engine.

2. Description of the Related Art

A variety of studies for purifying exhaust gases from an internal combustion engine e.g. of an automotive vehicle have been developed to prevent pollution of the atmosphere. Known harmful substances in the exhaust gas from the vehicle are HC, CO, and NOx. For example, one of schemes for purifying HC is disclosed in Japanese Patent Laid-open Publication Hei 5-59942.

Disclosed in the Publication is a conventional exhaust gas purifying system which includes, in this order from the upstream of an exhaust gas passage of the internal combustion engine, a first three-way catalyst, an HC adsorbent, and a second three-way catalyst for purifying HC while the temperature of the gas is relatively low just after the start of the engine. As well known, three-way catalyst has a lower capability of reactively purifying HC before its temperature rises up to an activating level (300° C.). Its capability will then increase as the temperature reaches the activation level. HC adsorbent has a higher capability of adsorbing HC when the temperature is low. When its temperature exceeds a certain level, the HC adsorbent starts desorbing HC. In the conventional exhaust gas purifying system, the first three-way catalyst is provided for extending a period before the temperature of the HC adsorbent reaches the certain level. During the extended period, the three-way catalyst is heated up to improve the purification of HC at the start of the engine.

Another scheme is disclosed in Japanese Patent Laid-open Publication Hei 5-31359. The scheme has a zeolite adsorbent, a honeycomb heater, and a main monolithic catalyst provided in an exhaust gas passage of an automotive vehicle so that HC in the exhaust gas of a lower temperature at the start of an engine is adsorbed by the adsorbing action of the zeolite adsorbent and further purified through energizing the honeycomb heater to instantaneously activate the catalyst on the heater.

However, in the former conventional system, the speed of rising the temperature of the exhaust gas is slowed down by the first three-way catalyst located at the upstream side. The speed of rising the temperature of the exhaust gas received by the HC adsorbent is not successfully retarded and the period before the temperature rises up to the level at which HC is desorbed from the HC adsorbent can hardly be extended to desired length.

In the latter conventional system, the catalyst is activated by heating with the honeycomb heater before the desorption of HC from the zeolite adsorbent starts. Since the catalyst is heated up within a short time, the supply of electric power to the honeycomb heater has to be increased.

SUMMARY OF THE INVENTION

It is an object of the present invention to provide an exhaust gas purifying system for an internal combustion engine in which the rise of the temperature of the HC adsorbent is properly retarded to improve the purification of HC at the start of the engine.

For achievement of the object of the present invention, an exhaust gas purifying system for an internal combustion engine having in an exhaust system of the internal combustion engine a three-way catalyst provided in the downstream side of an exhaust manifold, an adsorbent-catalyst provided under the floor of an automotive vehicle and containing at least zeolite in its composition, and a catalyst provided in the downstream side of the adsorbent-catalyst is characterized in that the heat capacity of an exhaust passage which connects between the three-way catalyst and the adsorbent-catalyst is increased greater than the heat capacity of the exhaust manifold. As featured, the temperature of the exhaust gas is absorbed by the action of the heat capacity of the exhaust passage as well as of the three-way catalyst provided in the downstream side of the exhaust manifold and hence, the rise of the temperature of the adsorbent-catalyst can further be retarded. As the rise of the temperature of the adsorbent-catalyst is retarded, HC can be adsorbed in the adsorbent-catalyst for a longer period of time, thus improving the purification of HC at the start of the engine.

Also, the present invention is featured in that the radiation of heat from the exhaust gas passage which connects between the three-way catalyst and the adsorbent-catalyst is increased higher than that of the manifold. As featured, the temperature of the exhaust gas is dropped down by the radiation of heat from the exhaust gas passage as well as the absorbing action of the three-way catalyst at the downstream side of the exhaust manifold and hence, the rise of the temperature of the adsorbent-catalyst can further be retarded. As the rise of the temperature of the adsorbent-catalyst is retarded, HC can be adsorbed in the adsorbent-catalyst for a longer period of time, thus improving the purification of HC at the start of the engine.

DETAILED DESCRIPTION OF THE PREFERRED EMBODIMENT

Figure 1:
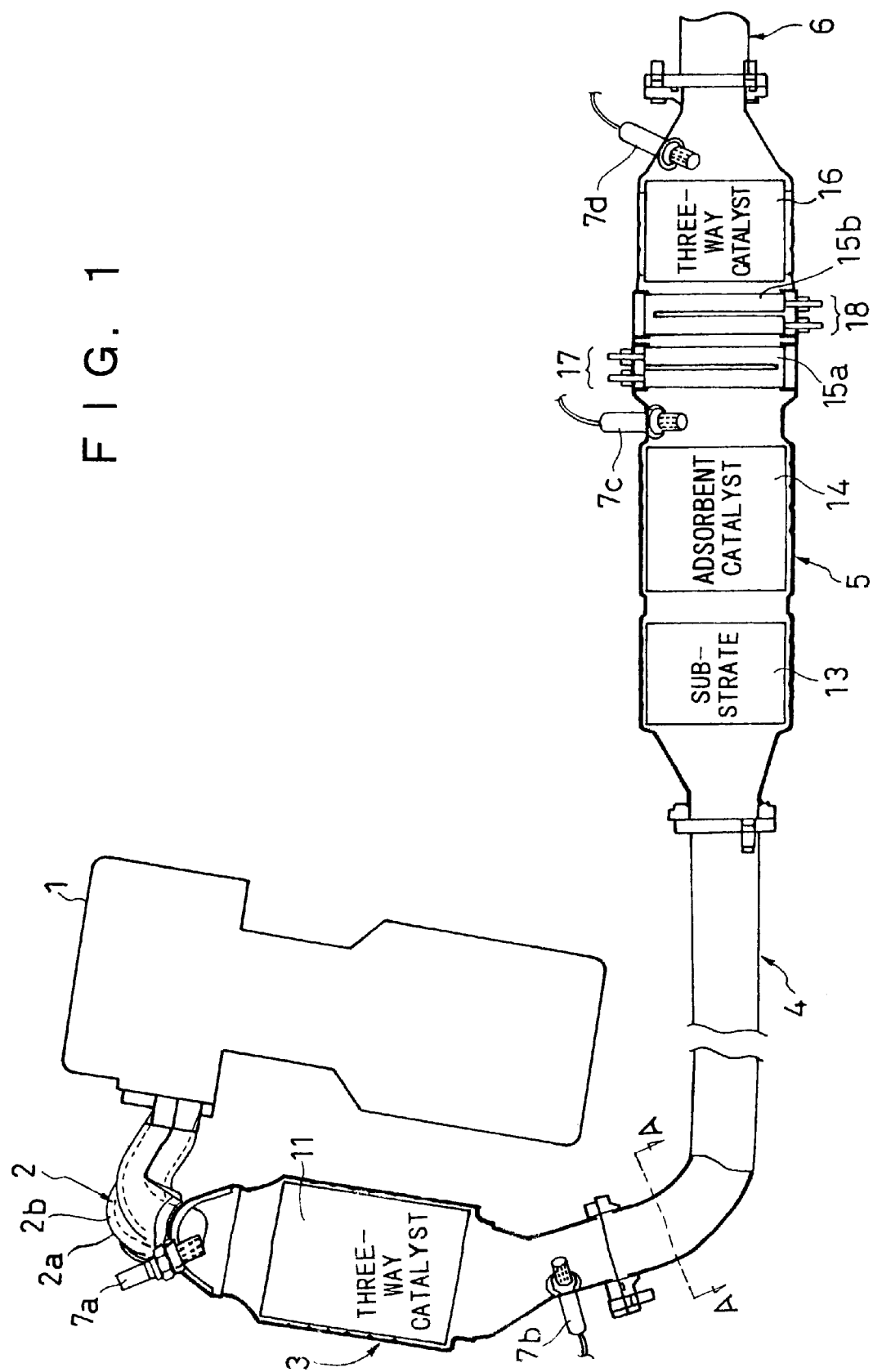
FIG. 1 is a schematic view showing an embodiment of the present invention.

The present invention will be described in more detail referring to the accompanying drawings. FIG. 1 is a schematic view of an exhaust gas purifying system for an internal combustion engine showing one embodiment of the present invention.

As shown, a series of an exhaust manifold 2, a first converter case 3, a first exhaust tube 4, a second converter case 5, and a second exhaust tube 6 are connected in the form of an exhaust gas passage on the exhaust side of an engine 1. Also, a plurality of air/fuel ratio sensors 7a to 7d, e.g. oxygen sensors, are disposed at given location of the exhaust gas passage. The air/fuel ratio sensors 7a may preferably be of a linear air fuel ratio sensor.

A three-way catalyst (TWC) 11 is mounted in the center of the first converter case 3 located at the downstream of the exhaust manifold 2. In this embodiment, the three-way catalyst 11 has about 1200 cells per square inch in cross section. The second converter case 5 contains, from upstream, a substrate 13, an adsorbent-catalyst 14, electrically heated catalysts 15a and 15b, and a three-way catalyst 16.

The exhaust manifold 2 which was once made of cast iron is fabricated in the embodiment by pressing a 0.5 mm thick stainless steel to a shape which is thus lower in the heat capacity than conventional one. The exhaust manifold 2 is coated with an exhaust manifold case 2a which is made by pressing a 1.5 mm thick stainless steel so that an air layer 2b is provided between the exhaust manifold 2 and the exhaust manifold case 2a forming a thermal insulating structure and is thus minimized in the radiation of heat. Accordingly, since the heat capacity and the heat radiation of the exhaust manifold 2 are minimized, the conduction of heat to the three-way catalyst 11 will be improved thus accelerating the activation of the three-way catalyst 11.

The substrate 13 is made of a honeycomb structure of a ceramic material or preferably of a metallic material which is higher in the absorption of heat. The metallic structure of the substrate 13 may be implemented by rolling a plain sheet and a corrugate sheet of highly heat-resistant ferrite stainless steel a number of times. In the embodiment, the metal substrate 13 incorporates a honeycomb structure having about 300 cells per square inch in cross section. To prevent increase of the exhaust resistance, the honeycomb structure is profiled relatively coarse as a role in the exhaust system.

The adsorbent-catalyst 14 has a structure having an HC adsorbent such as zeolite, e.g. ZSM-5, or layers of HC adsorbent and three-way catalyst provided on a honeycomb substrate. The honeycomb substrate of the adsorbent-catalyst 14 has about 1200 cells per square inch in cross section. As understood, the adsorbent-catalyst 14 can adsorb HC before the temperature reaches a particular degree and when heated up over the degree, it will desorb the adsorbed HC.

The electrically heated catalysts 15a and 15b are identical in the shape. It may be a honeycomb heater coated with the catalyst such as disclosed in Japanese Patent Laid-open Publication Hei 9-192453.

In this embodiment, the cross section includes about 500 cells per square inch. A pair of electrodes 17 and 18 are connected on the outer side of the honeycomb heater for supply of electric power. The electrodes 17 and 18 are fed with currents from a power source not shown. The electrically heated catalyst 15a contains platinum in its composition while the electrically heated catalyst 15b contains palladium in its composition, hence effectively purifying HC produced from the engine just after the start up. The power source for the electrically heated catalysts 15a and 15b may be a battery or alternator commonly mounted in an automotive vehicle or a specific battery or alternator provided for use with the electrically heated catalysts 15a and 15b.

When the engine 1 is started, an exhaust gas including HC runs through the exhaust manifold 2, the first converter case 3, the first exhaust tube 4, the second converter case 5, and the second exhaust tube 6 in the exhaust gas purifying system for internal combustion engine. The exhaust gas is first low in the temperature and the catalyst located in the exhaust gas passage remains below a level of activation and performs absorption of heat. Since the exhaust gas entering the adsorbent-catalyst 14 has a low temperature, it adsorbs HC. When the temperature of the exhaust gas rises with time, the catalysts in the exhaust gas passage are heated up.

The higher the temperature of the adsorbent in the adsorbent-catalyst 14, the faster the desorption of HC is promoted. When the desorbing speed exceeds the adsorbing speed, HC is desorbed from the adsorbent.

The three-way catalyst 11 is heated up by heat from the exhaust gas and the electrically heated catalysts 15a and 15b are heated and activated by the currents supplied via the electrodes 17 and 18 from the unshown power source. If the period before the temperature rises up to a level at which the HC adsorbent starts desorbing HC is not long, the temperature of the three-way catalyst 11 may not reach its activating level when the temperature of the HC adsorbent rises up to the level for desorbing HC. This will require the electrically heated catalysts 15a and 15b to be supplied with a greater supply of electric power for heating up within a short time thus stressing the power source.

For extending the period before the temperature of the HC adsorbent rises up to its HC desorbing level in the embodiment, an exhaust gas passage between the three-way catalyst 11 and the adsorbent-catalyst 14 (which is more particularly a passage extending from the downstream side of the three-way catalyst 11 to the upstream side of the adsorbent-catalyst 14 and including the first exhaust tube 4) is arranged greater in the heat capacity than the exhaust manifold 2.

Figure 2A:
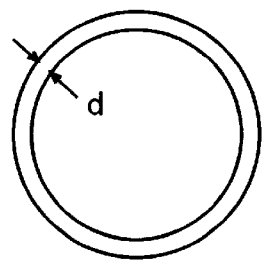
FIGS. 2A and 2B are cross sectional views taken along the line A—A of FIG. 1.
Figure 2B:
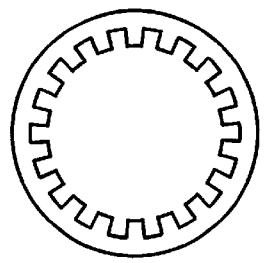

In a first example for increasing the heat capacity in the exhaust gas passage, the thickness d of a wall of the exhaust tube 4 in the exhaust gas passage is increased greater than the thickness of a wall of the exhaust manifold 2. More specifically, the thickness d is 1.5 mm in the embodiment. FIGS. 2A and 2B are cross sectional views taken along the line A—A of FIG. 1. As a second example, a substrate 13 which is high in the absorption of heat is provided in the exhaust gas passage. The substrate 13 may be accompanied with a catalyst. For instance, a three-way catalyst is used as the second catalyst for improving the capability of purifying the exhaust gas in normal conditions.

According to the two, first and second examples, the member provided in the exhaust gas passage is high in the heat capacity and can thus absorb heat from the exhaust gas at a higher efficiency even if the temperature of the exhaust gas entering the exhaust manifold 2 is increased with time after the start of the engine. The speed of increasing the temperature of the exhaust gas which runs into the adsorbent-catalyst 14 will hence be slowed down as compared with the conventional system with only the three-way catalyst 11.

This increases the period before the temperature of the HC adsorbent rises up to its HC desorbing level. The heat capacity of the exhaust manifold 2 is smaller and the speed of increasing the temperature of the exhaust gas entering the three-way catalyst 11 increases hence reducing the period before the temperature of the three-way catalyst 11 rises up to its activating level. Also, the period before the electrically heated catalysts 15a and 15b are activated is increased and the supply of electric power to the electrically heated catalysts 15a and 15b needs not to be increased, relieving the power source.

Figure 3A:
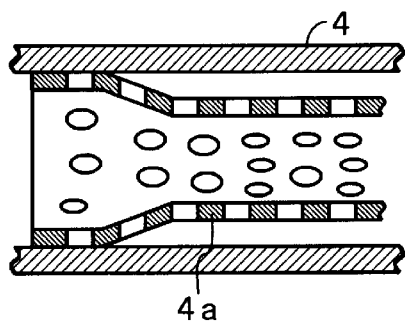
FIGS. 3A, 3B, and 3C are views of a partition mounted in an exhaust tube.
Figure 3B:
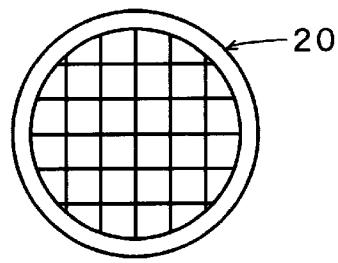
Figure 3C:
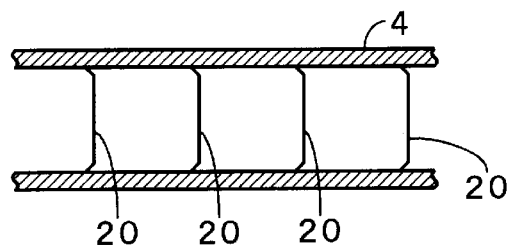

A third example of the embodiment is explained. The third example has a partition provided in the exhaust gas passage for allowing heat of the exhaust gas to stay, as shown in FIG. 3. The partition may be made of a small-diameter inner tube 4a provided in the first exhaust tube 4 and extending lengthwisely of the same as shown in FIG. 3A. The inner tube 4a has a multiplicity of holes therein for reducing the resistance of the exhaust gas. Also, another partition may be a group of partition sheets 20 made of a metal mesh material as shown in FIG. 3B. The partition sheets 20 are arranged at intervals of a proper distance in the exhaust tube 4 as shown in FIG. 3C. The partition sheets may be metal plates having a number of perforations.

A second embodiment of the present invention will now be described. The first embodiment previously described is featured in that the heat capacity of the exhaust gas passage is increased greater than that of the exhaust manifold 2. In the second embodiment, the radiation of heat from the exhaust tube is increased while the heat capacity of the exhaust gas passage is kept high, or the radiation of heat from the exhaust tube is only increased.

In a first example of this embodiment, the first exhaust tube 4 has an inner side or an outer side thereof shaped to a convex and concave configuration as shown in FIG. 2B. The both sides of the exhaust tube 4 may be shaped to a convex and concave configuration. The convex and concave configuration may be implemented by cutting parallel linear slots or a spiral slot lengthwisely of the exhaust tube 4 or simply making pits and lands. Preferably, the convex and concave configuration on the inner side of the first exhaust tube 4 is made in the respect of exhaust resistance by cutting parallel linear slots lengthwisely. The process of making the convex and concave configuration may be carried out by bulge forming, pressing, cutting, drawing, injection, or any other appropriate technique.

This permits the inner side of the exhaust tube to be increased in the area of contact with the exhaust gas thus improving the transfer of heat to the exhaust tube or the outer side of the exhaust tube to be increased in the area of contact with the outside air thus improving the radiation of heat. Accordingly, the rise of the temperature of the adsorbent-catalyst 14 can be retarded.

Figure 4:
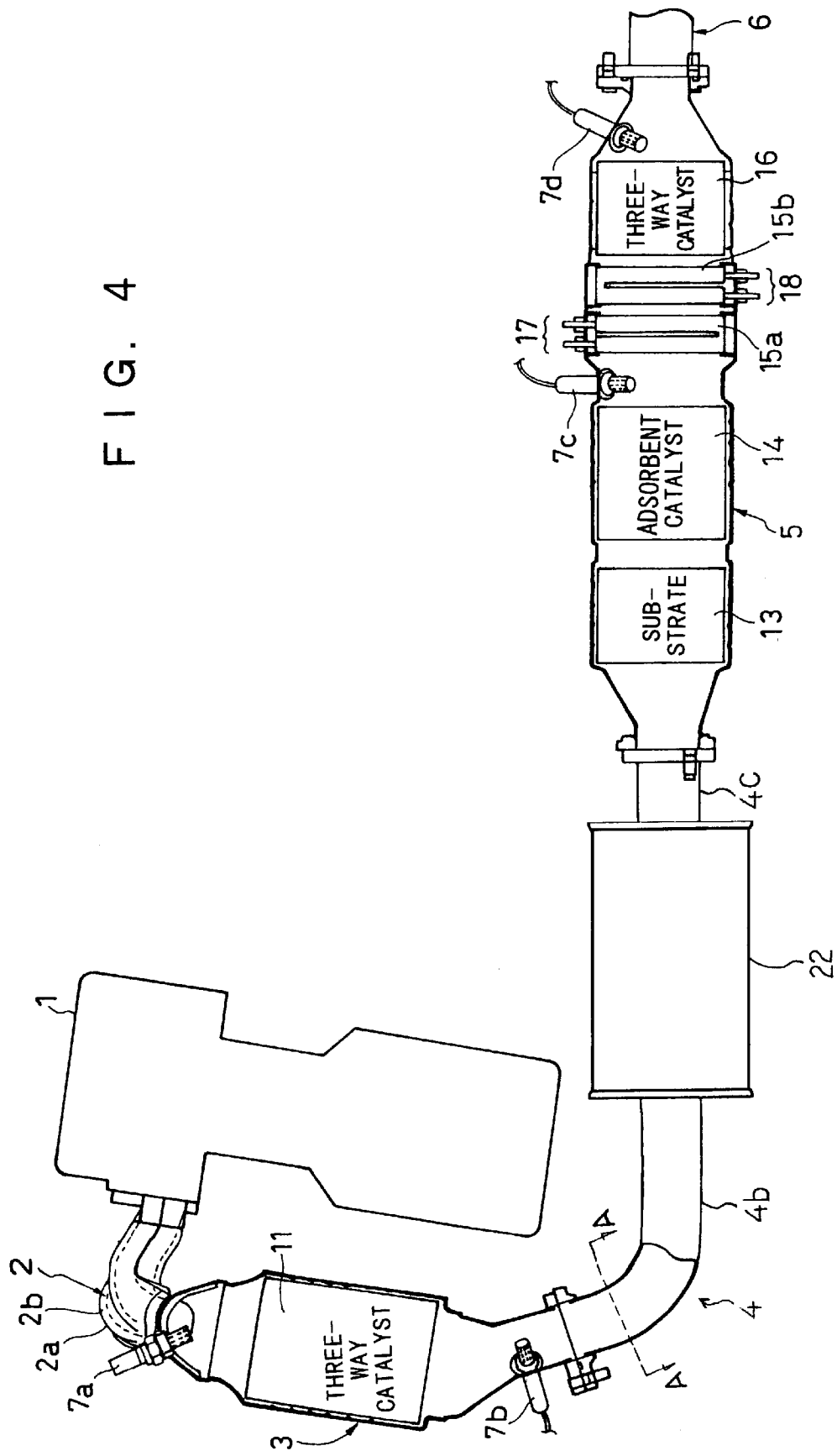
FIG. 4 is a schematic view showing another embodiment of the present invention.

A second example of the embodiment employs a muffler 22 provided in the exhaust tube as shown in FIG. 4. In this example, the heat capacity and the radiation of heat on the exhaust tube can be improved. The muffler 22 may be of known resonance, expansion, or their combination type.

Figure 5:
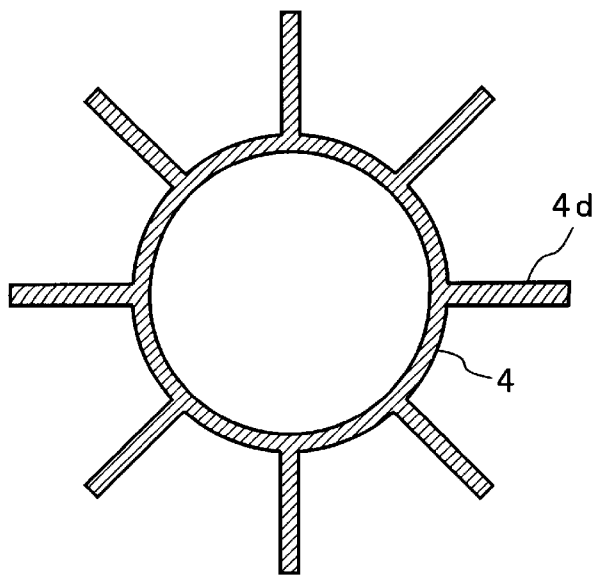
FIG. 5 is a cross sectional view of the exhaust tube having fins provided on the outer side thereof.

A third example uses fins 4d provided on the outer side of the exhaust tubes 4b and 4c as shown in FIG. 5. This increases the radiation of heat from the exhaust tube 4 and thus retards the rise of the temperature of the adsorbent-catalyst 14.

It would be understood that the foregoing examples are provided in any combination to have more favorable effects than that of each example.

According to the present invention, the heat capacity of the exhaust gas passage connecting between the three-way catalyst on the downstream side of the exhaust manifold and the adsorbent-catalyst under the vehicle floor is increased greater than that of the exhaust manifold. Hence, the heat of the exhaust gas is absorbed by means of the heat capacity of the exhaust gas passage as well as the action of the three-way catalyst and the rise of the temperature of the adsorbent-catalyst can further be retarded. Since the rise of the temperature of the adsorbent-catalyst is retarded successfully, HC is adsorbed in the adsorbent-catalyst for a longer period and the purification of HC at the start of the engine will thus be improved.

Also, the radiation of heat from the exhaust gas passage between the three-way catalyst and the adsorbent-catalyst is increased higher than that of the exhaust manifold. Accordingly, the temperature of the exhaust gas is dropped down through the absorbing action of the three-way catalyst on the downstream side of the exhaust manifold and the radiating action of the exhaust gas passage, and the rise of the temperature of the adsorbent-catalyst can further be retarded. Since the rise of the temperature of the adsorbent-catalyst is retarded successfully, HC is adsorbed in the adsorbent-catalyst for a longer period and the purification of HC at the start of the engine will thus be improved.

The embodiments of the present invention offer the following advantages.

(1) The electrically heated catalysts located at the downstream side of the adsorbent-catalyst are activated by a lower power in the period before the desorption of HC from the adsorbent-catalyst is started, and the HC desorbed from the adsorbent-catalyst can be purified.

(2) Because the substrate is provided across the exhaust gas passage, the rise of the temperature of the adsorbent-catalyst can be retarded with the use of a simple construction.

(3) Because the second catalyst is provided in the exhaust gas passage to improve the purification of the exhaust gas, the rise of the temperature of the adsorbent-catalyst can further be retarded.

(4) Because the partition which allows heat of the exhaust gas to stay is provided in the exhaust gas passage, the rise of the temperature of the adsorbent-catalyst can further be retarded.

(5) Because the muffler is provided across the exhaust gas passage to increase the heat capacity and the radiation of heat, the rise of the temperature of the adsorbent-catalyst can further be retarded.

(6) Because the fins for radiation of heat is provided in the exhaust gas passage to increase the radiation of heat, the rise of the temperature of the adsorbent-catalyst can further be retarded.

(7) Because the thickness of a wall of the exhaust tube in the exhaust gas passage is increased greater than that of the exhaust manifold, the heat capacity of the exhaust gas passage is higher than that of the exhaust manifold and the rise of the temperature of the adsorbent-catalyst can be retarded while the conduction of heat to the catalyst at the downstream side of the exhaust manifold is improved.

(8) Because at least the inner or outer side of the exhaust gas passage is shaped to a convex and concave configuration so that the area of contact with the exhaust gas on the inner side or with the outside air on the outer side is increased to improve the conduction of heat to the exhaust tube or the radiation of heat, the rise of the temperature of the adsorbent-catalyst can be retarded successfully.

What is claimed is:

1. An exhaust gas purifying system for an internal combustion engine having in an exhaust system of the internal combustion engine a three-way catalyst provided in the downstream side of an exhaust manifold, an adsorbent-catalyst provided under the floor of an automotive vehicle and containing at least zeolite in its composition for adsorption of hydrocarbons, and a catalyst provided in the downstream side of the adsorbent-catalyst, characterized in that:

the heat capacity of an exhaust gas passage which connects between the three-way catalyst and the adsorbent-catalyst is greater than the heat capacity of the exhaust manifold.

2. An exhaust gas purifying system for an internal combustion engine according to claim 1, wherein the catalyst provided in the downstream side of the adsorbent-catalyst is electrically heated catalyst.

3. An exhaust gas purifying system for an internal combustion engine according to claim 2, wherein a substrate is provided in the exhaust gas passage.

4. An exhaust gas purifying system for an internal combustion engine according to claim 1, wherein a substrate is provided in the exhaust gas passage.

5. An exhaust gas purifying system for an internal combustion engine according to claim 1, wherein a second catalyst is further provided in the exhaust gas passage.

6. An exhaust gas purifying system for an internal combustion engine according to claim 1, wherein a partition for allowing heat of the exhaust gas to stay is provided in the exhaust gas passage.

7. An exhaust gas purifying system for an internal combustion engine according to claim 1, wherein a plurality of fins are provided on the exhaust gas passage.

8. An exhaust gas purifying system for an internal combustion engine according to claim 1, wherein the thickness of a wall of an exhaust tube in the exhaust gas passage is greater than the thickness of a wall of the manifold.

9. An exhaust gas purifying system for an internal combustion engine according to claim 1, wherein the exhaust tube in the exhaust gas passage has at least one of the inner side and outer side thereof shaped in a convex and concave configuration.

10. An exhaust gas purifying system for an internal combustion engine having in an exhaust system of the internal combustion engine a three-way catalyst provided in the downstream side of an exhaust manifold, an adsorbent-catalyst provided under the floor of an automotive vehicle and containing at least zeolite in its composition for adsorption of hydrocarbons, and a catalyst provided in the downstream side of the adsorbent-catalyst, characterized in that:

the radiation of heat of an exhaust gas passage which connects between the three-way catalyst and the adsorbent-catalyst is greater than the radiation of heat of the exhaust manifold.

11. An exhaust gas purifying system for an internal combustion engine according to claim 10, wherein the catalyst provided in the downstream side of the adsorbent-catalyst is electrically heated catalyst.

12. An exhaust gas purifying system for an internal combustion engine according to claim 11, wherein a substrate is provided in the exhaust gas passage.

13. An exhaust gas purifying system for an internal combustion engine according to claim 10, wherein a substrate is provided in the exhaust gas passage.

14. An exhaust gas purifying system for an internal combustion engine according to claim 10, wherein a second catalyst is further provided in the exhaust gas passage.

15. An exhaust gas purifying system for an internal combustion engine according to claim 10, wherein a partition for allowing heat of the exhaust gas to stay is provided in the exhaust gas passage.

16. An exhaust gas purifying system for an internal combustion engine according to claim 10, wherein a plurality of fins are provided on the exhaust gas passage.

17. An exhaust gas purifying system for an internal combustion engine according to claim 10, wherein the thickness of a wall of an exhaust tube in the exhaust gas passage is greater than the thickness of a wall of the manifold.

18. An exhaust gas purifying system for an internal combustion engine according to claim 10, wherein the exhaust tube in the exhaust gas passage has at least one of the inner side and outer side thereof shaped in a convex and concave configuration.

* * * * *